United States Patent [19]
Long

[11] Patent Number: 6,099,288
[45] Date of Patent: Aug. 8, 2000

[54] PELLET FORMING EXTRUSION APPARATUS

[75] Inventor: David H. Long, Springfield, Ohio

[73] Assignee: MP6, L.L.C., Fort Lauderdale, Fla.

[21] Appl. No.: 09/045,039

[22] Filed: Mar. 20, 1998

Related U.S. Application Data

[60] Provisional application No. 60/041,322, Mar. 20, 1997, and provisional application No. 60/039,369, Mar. 20, 1997.

[51] Int. Cl.[7] .............................. B29B 9/00; B29C 47/60
[52] U.S. Cl. ................. 425/208; 425/331; 425/DIG. 230
[58] Field of Search ..................................... 425/331, 208, 425/DIG. 101, DIG. 230, 374, 311, 313

[56] References Cited

U.S. PATENT DOCUMENTS

| | | | |
|---|---|---|---|
| 2,252,900 | 8/1941 | Shafer | 425/311 |
| 2,319,859 | 5/1943 | Hale | 264/142 |
| 2,370,952 | 3/1945 | Gordon | 264/142 |
| 2,422,480 | 6/1947 | Gordon et al. | 425/104 |
| 2,653,350 | 9/1953 | Piperoux | 425/202 |
| 2,991,503 | 7/1961 | Rietz | 425/202 |
| 3,086,444 | 4/1963 | De Back | 99/443 |
| 3,240,169 | 3/1966 | Cunningham | 425/310 |
| 3,304,578 | 2/1967 | Clute | 425/382 R |
| 3,312,530 | 4/1967 | Sackett | 422/210 |
| 3,321,802 | 5/1967 | Wood et al. | 425/461 |
| 3,323,168 | 6/1967 | van Drunen et al. | 425/461 |
| 3,332,219 | 7/1967 | Lundell | 56/1 |
| 3,389,204 | 6/1968 | Häfliger | 264/142 |
| 3,416,774 | 12/1968 | Fritsch | 336/90 |
| 3,487,503 | 1/1970 | Barr et al. | 425/208 |
| 3,511,190 | 5/1970 | Kunz | 425/331 |
| 3,574,891 | 4/1971 | Bredeson et al. | 425/192 R |
| 4,104,958 | 8/1978 | Manser et al. | 99/355 |
| 4,221,340 | 9/1980 | dos Santos | 241/7 |
| 4,372,734 | 2/1983 | Dolan et al. | 425/131.1 |
| 4,381,184 | 4/1983 | Hurni et al. | 425/202 |
| 4,422,372 | 12/1983 | Hoezee | 99/353 |
| 4,446,086 | 5/1984 | Molenaar et al. | 264/118 |
| 4,511,321 | 4/1985 | Howard | 425/331 |
| 4,630,533 | 12/1986 | Schaaf et al. | 99/353 |
| 4,704,080 | 11/1987 | Stork et al. | 425/314 |
| 4,731,010 | 3/1988 | Cunningham | 425/461 |
| 4,744,995 | 5/1988 | Robinson | 426/454 |
| 4,767,301 | 8/1988 | Volk, Jr. | 425/14 |
| 4,770,625 | 9/1988 | Appelgren et al. | 425/331 |
| 4,817,517 | 4/1989 | Ammann et al. | 99/483 |
| 4,960,554 | 10/1990 | Bambrick | 264/219 |
| 5,009,586 | 4/1991 | Pallmann | 425/311 |
| 5,052,912 | 10/1991 | Masao | 425/313 |
| 5,240,400 | 8/1993 | Fujimoto et al. | 425/310 |
| 5,242,292 | 9/1993 | Wenger | 425/308 |

FOREIGN PATENT DOCUMENTS

| | | |
|---|---|---|
| 386 597 | 9/1988 | Austria . |
| 509708 | of 0000 | France . |
| 2 444 495 | 7/1980 | France . |
| 2 635 044 | 2/1990 | France . |
| 35 902 | of 0000 | Germany . |
| 874 399 | 4/1939 | Germany . |
| 55-1166 | of 0000 | Japan . |
| 347 637 | 8/1960 | Switzerland . |
| 757607 | of 0000 | United Kingdom . |
| 820729 | of 0000 | United Kingdom . |

OTHER PUBLICATIONS

International Application WO 93/06742 published Apr. 15, 1993, inventor Wenger, L.G.

*Primary Examiner*—Robert Davis
*Assistant Examiner*—Thukhanh T. Nguyen
*Attorney, Agent, or Firm*—Middleton & Reutlinger; John F. Salazar

[57] ABSTRACT

A pellet-forming apparatus is provided for extruding high moisture materials in a low-pressure extrusion apparatus having an extruding cylinder and a cooperative extruding rotor. The rotor extends axially through the elongated cylinder and is formed with multi-tier extruding surfaces that are configured and positioned to be radially spaced with respect to the interior surface of the cylinder and form a pressure zone to effect radial displacement of the material through passages formed in the cylinder wall and be extruded exteriorly of the cylinder. The rotor preferably consists of a series of configured plates arranged along a common axis to form a combined auger-shaped extruding rotor. A feed conveyor comprising a helical flight auger is provided in preceding axial relationship to the extruding cylinder for feeding of material into the cylinder without substantial pressure buildup.

18 Claims, 6 Drawing Sheets

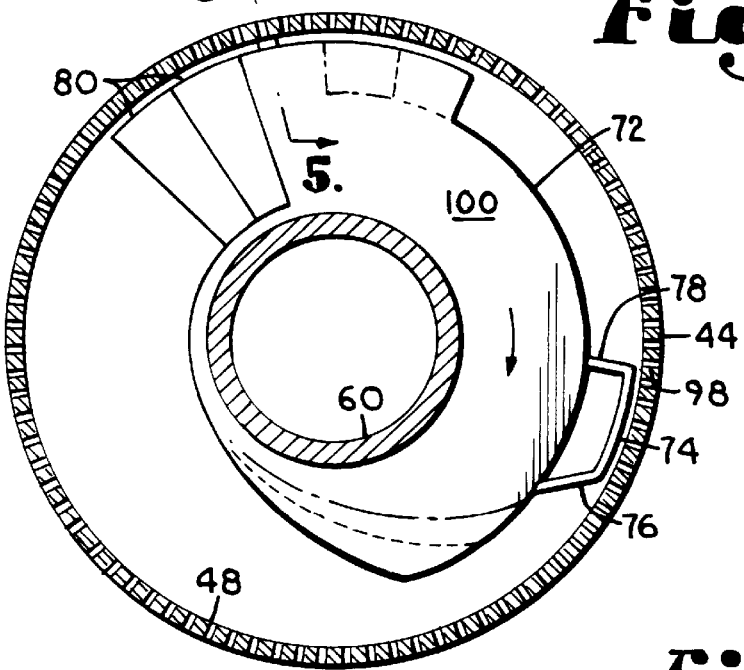
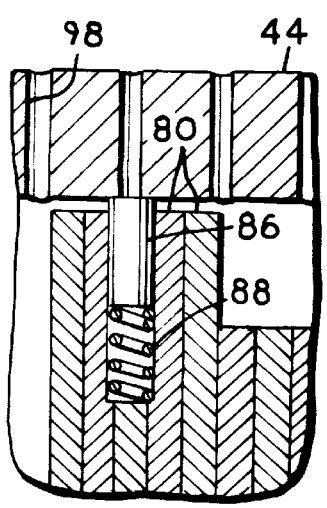
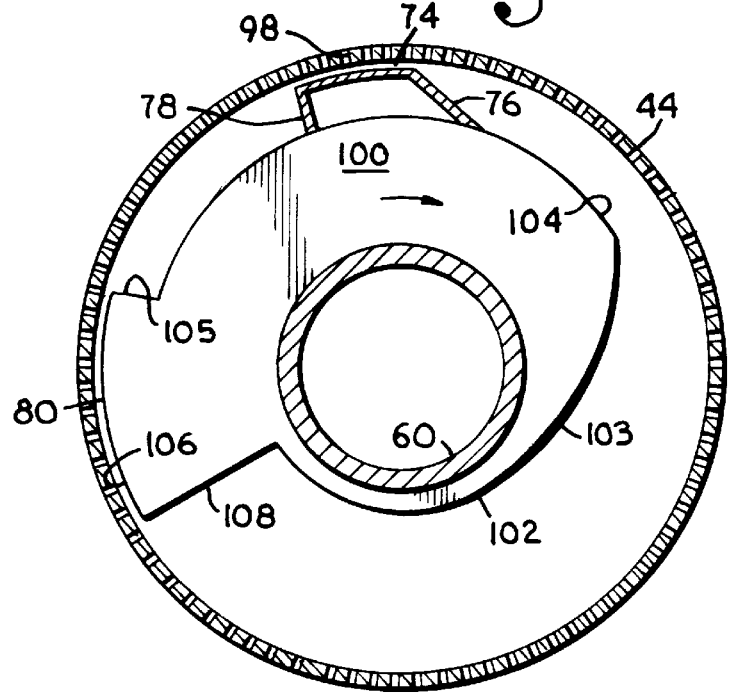

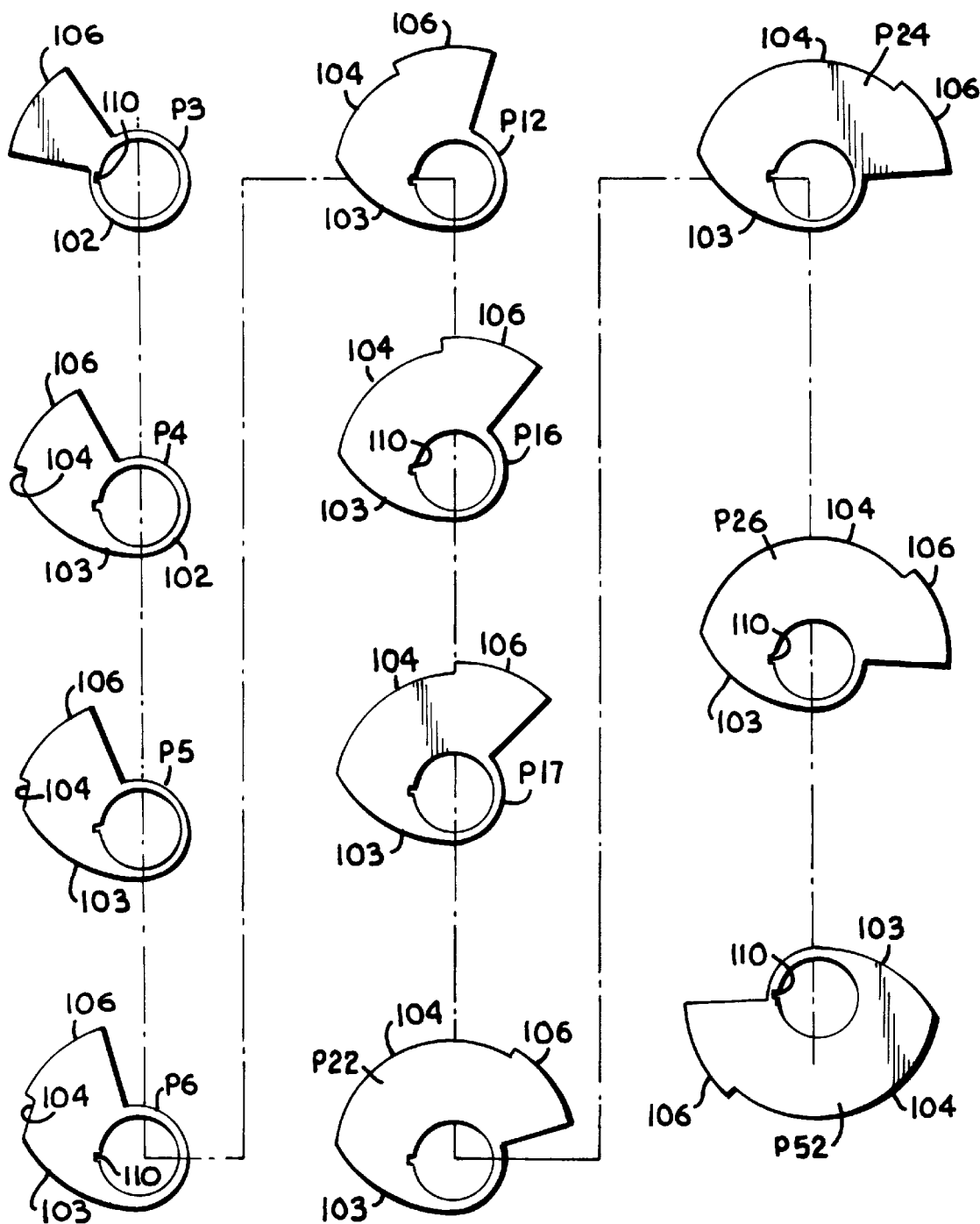

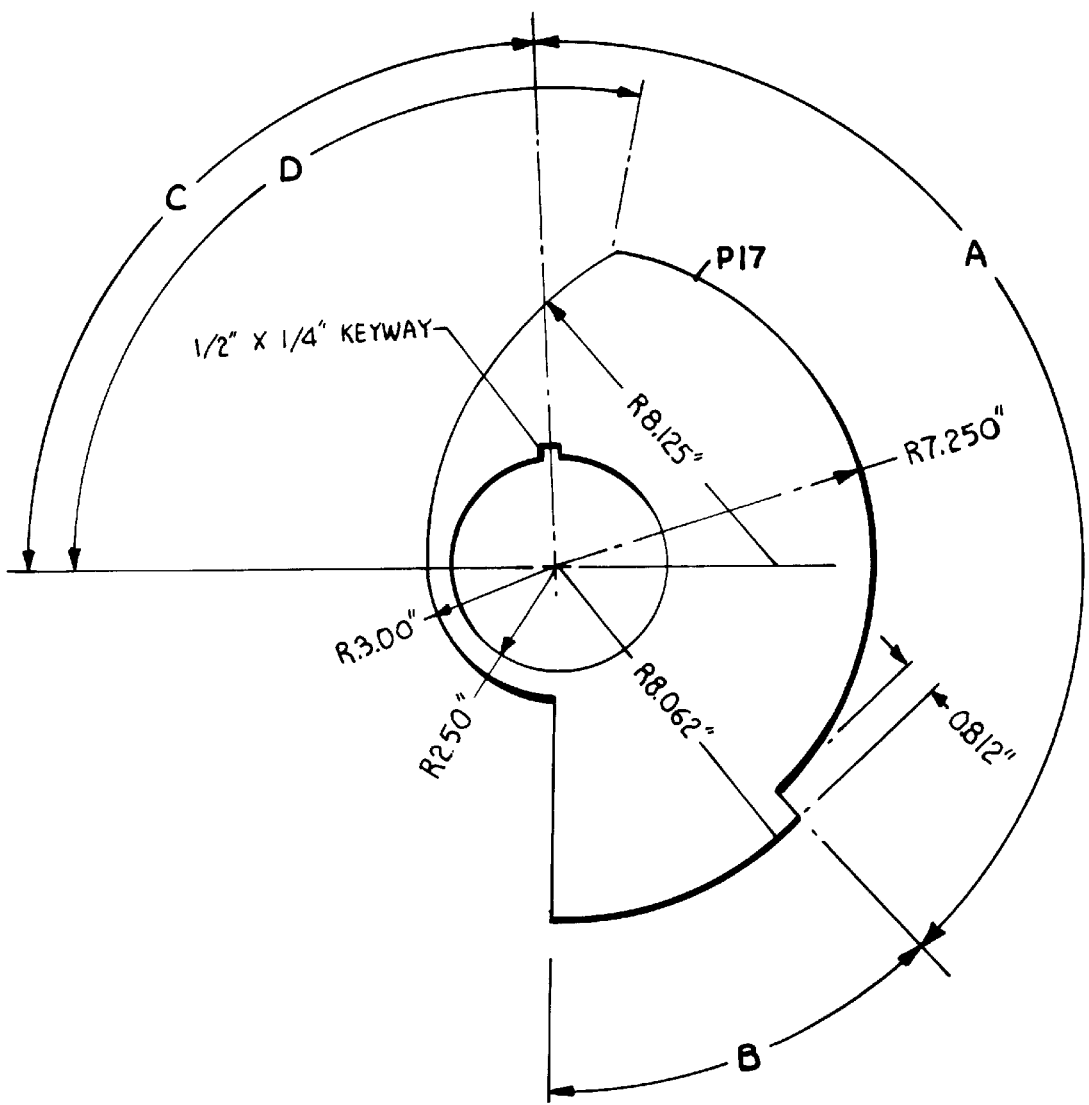

PELLET FORMING EXTRUSION APPARATUS

This application is entitled to priority pursuant to provisional application Ser. No. 60/041,322, filed Mar. 20, 1997, entitled Extrusion Apparatus and provisional application Ser. No. 60/039,369, filed Mar. 20, 1997, entitled Pellet Forming Apparatus Having Helical Flight Auger and Auger Construction.

BACKGROUND OF THE INVENTION

This invention relates, in general, to an apparatus for forming pliable material into rod-shaped pellets and, more particularly, to an apparatus for compacting and extruding material into elongated strands or rod-shaped elements of either predetermined length or of an indeterminate length.

Formation of diverse materials, such as vegetable matter, slaughterhouse waste, and the like, into rod-shaped elements of various selected lengths is a common practice employed in processing of materials. The objective of forming the materials into rod-shaped elements, which are commonly referred to as "pellets" and the process as extruding or "pelletizing," is to place the material into a form that can be easily handled and, if appropriate, subjected to further processing, such as drying operations. Principally, pelletizing techniques are utilized to place a material which is initially in a granular or particulate form into a compacted mass having a particular shape and having a desired structural integrity so as to maintain its configuration when either being utilized or subjected to further processing.

For example, animal and pet foods typically are sold in a pellet form. This form makes the food relatively easy to handle, uniform in texture and consistency, and typically reduces spoilage as compared to non-pelletized foods such as raw grain, grasses, and animal products. Transforming such foods into pelletized form generally sterilizes the food and removes much of its moisture making it less subject to degrading and spoilage.

Generally, extruders are used for pelletizing of materials. Typical extruders use an auger in a barrel to displace material along the axis of the barrel and to force the material through a perforated plate at the end of the barrel, in much the same way as common meat grinders work. The perforated plate is positioned in axial relationship to a helical auger conveyor which, when revolved, will axially displace the material against the extrusion plate and force the material through the perforations. Those perforations are of a size that is appropriate for the particular material and the desired pellet configurations so that, when the material is extruded, it will be compacted into a mass having adequate structural integrity to maintain its configuration. The material extruded initially may be in the form of elongated strands, but those strands generally are separated after extrusion into rod-shaped elements that are of a desired length.

The extruding auger is mechanically coupled to a driving mechanism such as an electric motor and is operated at a desired rotational speed with sufficient power input to cause displacement of the material along the axis of the auger and to be forcefully extruded through the extrusion plate. This auger-type extrusion mechanism requires a substantial amount of power to extrude the material through the extruding plate. The high levels of mechanical power required are a result of the high pressure-type extrusion systems utilized in these prior art mechanisms as well as the configuration of those devices. Basically, the augers in these prior art mechanisms are designed to build pressure in the material along the entire length of the auger. This allows the material to be compressed to a very high pressure, e.g., 300–500 psi, by the time the material reaches the extrusion plate. Typically, such high pressure extruders are operated with a relatively dry mix and materials, generally about 10 to 25 percent by weight moisture content. These extruders commonly use steam injection to heat and lubricate the mixture in the extruders. In the case of food materials, these high pressure extruders typically impart sufficient energy input to partially cook the material involved. However this high power required in prior art extruders make them expensive to buy, operate, and maintain. Large motors are required to produce the high pressures involved. For example, it is common for a commercial extruder to require a 150 to 800 horsepower drive motor.

A variation on the meat grinder approach includes use of a cylindrical extruding section. These extruders operate in fundamentally the same manner as other prior art extruders, utilizing a pressure buildup along the length of the auger to force the material out through the extrusion holes in the barrel. Such a system is described in U.S. Pat. No. 5,242,292, which is incorporated herein by reference. Thus, prior art barrel extruders are subject to generally the same limitations as other prior art extruders, requiring high power inputs and relatively dry material for effective extrusion.

It is common in both types of prior art extruders to use an extruding auger to build pressure and a separate wiper mechanism to facilitate pushing of material through extrusion orifices. For example in the U.S. Pat. No. 5,242,292, a pressurizing auger, see item 44 FIG. 5., is used to subject the material to increasing shear and pressure along the barrel. The material is thus moved axially along the extruder barrel, building extrusion pressure. After the extrusion operation, a separate wiper vane, see item 70 on FIG. 4 and Col. 4, line 39, is used to shear material at the extrusion orifices, 58. This wiper vane is not designed to effect axial movement of material.

Prior art extrusion mechanisms have not been found to be capable of efficiently and effectively pelletizing material with high moisture content, such as in food processing or processing of newly-harvested crops. High pressure extrusion of high moisture materials causes loss of pellet form due to high discharge velocities created through the extrusion holes, effectively limiting moisture content in material to be extruded to a maximum of about 30 percent by weight. One means of addressing this problem has been to partially dry and, in the case of food, cook the material prior to extrusion. However, this requires that additional material preparation steps and apparatus be included in the overall process, increasing complexity and cost of the overall pelletizing operation.

The high power inputs required to operate the prior art extruders requires the mechanisms to have extremely large drive shafts to handle the high torque requirements. Further, the high pressure and power levels involved also work to cause degradation in the auger mechanisms through erosion and stress. These factors lead to increased maintenance and operating expense. Moreover, such prior art apparatus has the detrimental aspect of being relatively slow in operation and, thus, being capable only of processing relatively small quantities of material in specified time periods.

An additional limitation of such prior art apparatus is that the extruding auger is difficult to manufacture. Due to the high pressures involved, extremely heavy and rigid auger rotors are required. Fabrication of such rotors is difficult and further adds to the complexity of such devices.

SUMMARY OF THE INVENTION

In order to address these considerations, it is an object of the present invention to provide a pellet-forming apparatus which utilizes low-pressure pelletizing and extruding techniques.

It is a related object of this invention to provide a pellet-forming apparatus suitable to pelletize relatively wet material.

It is a further object of this invention to provide a pellet-forming apparatus that has minimal power requirements to process the material.

It is an additional object of this invention to provide a pellet-forming apparatus which is designed for ease of manufacture and maintenance.

These and other objects of the invention will be apparent in the following specification, claims and drawings.

In accordance with the present invention, the pellet-forming apparatus includes a cylindrical extruding mechanism adapted to receive material and to discharge the material in a compacted pellet form. The present invention consists of a pellet-forming apparatus for forming of material consisting of a mixture of particles of pliable solids and high percentage of a liquid into elongated rod-shaped elements. The pellet-forming apparatus consists of an elongated extruding cylinder, preferably disposed with its longitudinal axis substantially horizontal, and having an entrance end through which the material is introduced into said cylinder. The cylinder has a cylindrical wall formed with a plurality of radially oriented passages that each open to respective interior and exterior surfaces of said cylindrical and through which material may be extruded in a radially outward direction. Such passages are distributed in spaced apart relationship around said cylinder. The present invention is a low-pressure extruder which utilizes a helically-shaped extruding rotor disposed in said cylinder, arranged with a helix face, a pusher face, and a wiper face, the helix face configured to urge said mixture both radially outward and, also, axially when the rotor is rotated axially within said cylinder, the pusher face configured to further urge said mixture against the wall of said cylinder and through the passages therein, and the wiper face configured to wipe material which was not extruded by the pusher face from the interior of the cylinder. In contrast to the prior art, all three faces are present in substantially the same area along the axis of the rotor. This complex combination of shapes to form these three faces appears to synergistically enhance the functions of these faces for enhanced efficiency.

The combined multi-step design functions to allow extrusion without the pressure buildup required in prior art extruders by radially impelling material to a point where it may be wiped through the extrusion holes. These extruding surfaces are arranged to enhance radial displacement of the material as well as providing the ability to effect adequate radial displacing force to compact the material against the inner wall surface of the extruding cylinder and to effect displacement of the material through the orifices formed in the cylinder wall. Depending upon the structural integrity of the material as it is compacted and extruded, the material will thus be formed into elongated strands that may, as a consequence of gravitational forces or mechanical means such as is described herein, be broken up into indeterminate lengths and simply fall from the cylinder onto a receiving mechanism.

Thus, present invention utilizes substantially lower extrusion pressure as compared to prior art devices. In this manner, a variety of materials including moist materials may effectively be extruded. Further, the low pressure design allows extrusion to occur with minimal power input, thus reducing the size of motors and extruder structure as compared to prior art extruder, as well as eliminating many of the wear problems associated with prior art devices.

In one aspect, the present invention rotor allows rotor fabrication by combining a plurality of appropriately shaped flat plates. In this manner, the rotor manufacturing process is significantly simplified and rotor configuration may easily be modified to accommodate particular material consistencies for extrusion and allow use of various materials of construction for the present invention. For example, because of the type of process used for construction of the present invention auger, a wide variety of steels can readily be used in auger fabrication to accommodate materials with various properties of abrasion and corrosion. Moreover, the method of fabrication facilitates manufacture of the complex multi-tier rotor.

In a basic form of the invention, the extrusion cylinder and its associated extruding bar may be fed with the material by means of a helical auger conveyor device. That conveyor device is disposed in axial alignment with the extruding cylinder and is operative to receive the material at an inlet end of it and to displace that material axially and deposit into the interior of the extruding cylinder. Preferably a material metering device known in the art, such as a variable speed volumetric feeder, will be used to control the amount of material provided to the extruder, so as to control the amount of fill of material in the apparatus.

In another basic form, the present invention is advantageously provided with what is termed a "rock trap." This rock trap is positioned at a terminal end of the extruding cylinder in remote relationship to the material entrance end. The functioning of this rock trap, which merely comprises a cylindrical compartment of particular length, is to receive objects such as rocks or metal components that are of a size greater than that which would permit their passage through the extrusion apertures. The extruding bar operates to simply cause those objects to be continually axially displaced along its length and to be ultimately deposited in the rock trap. This rock trap may be provided with an access opening to permit periodic removal of the collected objects or the apparatus may simply be disassembled to effect removal of those collected objects.

In a further embodiment of the apparatus, the extrusion cylinder is provided with a mechanism for severing the extruded strands of material into pellets of predetermined length. This mechanism comprises a cutter bar or knife extending longitudinally of the extrusion cylinder and supported for revolution around the exterior of the cylinder. The cutter bar is of a length substantially equal to the length of the extrusion cylinder and as the cutter bar is revolved, the operating edge is caused to be displaced over the exterior surface of the extruding cylinder and to sever the strands as the bar passes their point of exit from the cylinder. Revolution of the cutter bar at a selected rotational speed in accordance with the extruding speed of the material will result in the strands of the material being severed into pellets of a predetermined length and with uniformity in that length.

BRIEF DESCRIPTION OF THE DRAWINGS

FIG. 3 is sectional view taken along line 3—3 of FIG. 1 showing one of the plates utilized in fabricating of an extruding rotor with the next two adjacent plates shown in phantom lines illustrating the angular displacement of such adjacent plates.

FIG. 4 is a sectional view taken along line 4—4 of FIGS. 1 & 2 showing details of an extruding rotor and a pusher face.

FIG. 5 is a sectional close up perspective view of the rotor taken along line 5—5 of FIG. 3 showing a wiper pin.

FIG. 8 shows selected rotor plates from a set of plates, demonstrating a further alternative embodiment of the present invention.

FIGS. 9A, 9B and 9C show close up views of three rotor plates from FIG. 8 demonstrating, details of plate fabrication.

DESCRIPTION OF THE INVENTION AND PREFERRED EMBODIMENTS

Figure 1:
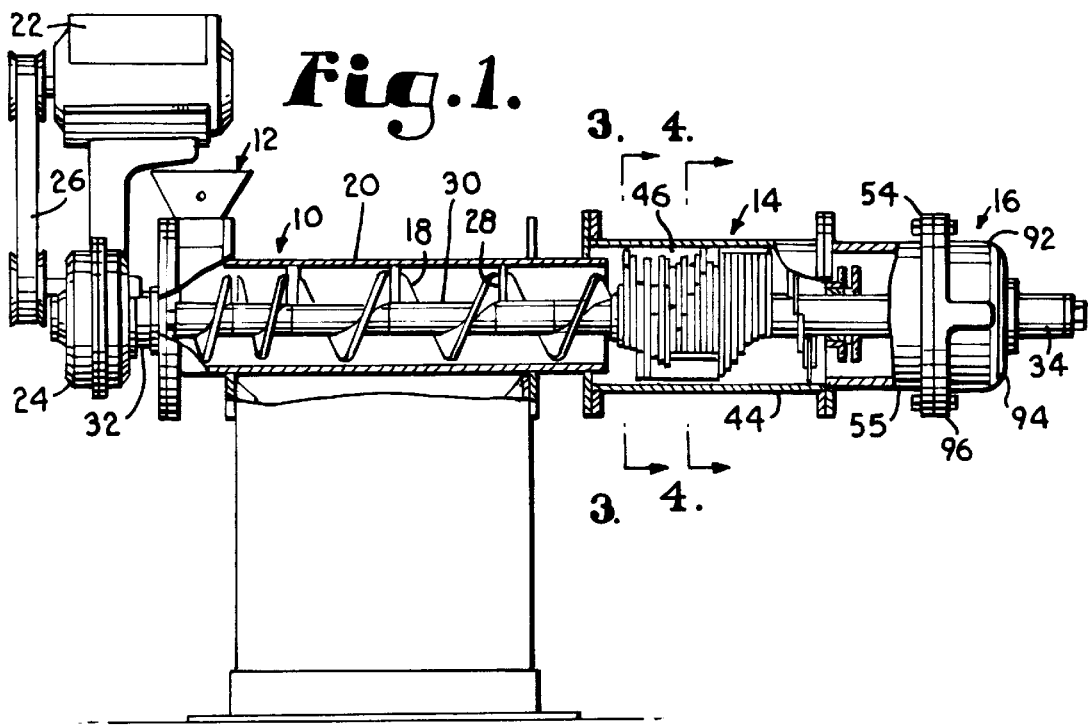
FIG. 1 is a side elevation view of a pellet-forming apparatus embodying this invention with portions thereof broken away for clarifying illustration of some internal components.

Referring to FIG. 1, a pellet-forming apparatus embodying this invention is diagrammatically illustrated in sectional elevation view. This apparatus includes as its basic components a feed conveyor 10, an inlet feeder 12, a pellet extruder 14 and a rock trap 16. The inlet feeder 12 functions to provide means for introducing and controlling the amount of material into the feed conveyor 10. That feed conveyor 10 then conveys the material axially in a direction toward the pellet extruder 14 from which the material is then extruded to form the rod-shaped pellets. To accommodate debris such as rocks and metal objects, a rock trap 16 is provided and is positioned in downstream axial relationship to the pellet extruder which is also disposed in axial relationship to the feed conveyor and receives the material from it.

In this illustrative embodiment, the feed conveyor 10 is of a standard screw auger type which includes an auger 18 disposed within an elongated cylindrical tube 20. The auger is revolved at a predetermined speed to convey the material axially from an inlet end that is interconnected with the inlet feeder 12 in a direction toward and into the pellet extruder 14. Revolving of the auger 18 is effected by means of an electric motor 22 mechanically coupled to the auger through a speed reduction unit 24 such as by means of a belt and pulley drive 26. The feed conveyor is provided with what are commonly termed "breaker bars" 28 to prevent slippage of material along the feed conveyor 10.

Introduction of the material into the feed conveyor 10 is effected through the inlet feeder 12. Again, the inlet feeder 12, as illustrated, is to be considered as exemplary as other mechanisms may be provided to perform this general function. In addition to this general function of introducing the material into the feed conveyor, the inlet feeder 12 is advantageously designed to effect and permit control of the rate or inflow of the material.

Structural details of the inlet feeder 12, as well as many details of the feed conveyor 10 and its associated drive mechanism, are not otherwise or further illustrated or described. Those components may be selected by one skilled in the art in accordance with the requirements of a particular installation and the processing capacity of the pellet-forming apparatus. It will also be noted that the illustrative embodiment is shown as being disposed in a substantially horizontal plane. The horizontal orientation is particularly advantageous to the inlet feeder 12 which may be readily fed by gravity-type feed systems from a suitable source for the material. However, the present invention includes other orientations and arrangements. In addition, the inlet feeder 12 and the feed conveyor 10 may be mounted on independent support devices or these components may be incorporated into or with other apparatus that may be utilized to further process the pellets that are formed by the present invention.

Further mechanical details of the structure of the feed conveyor 10 can be best seen in the fragmentary sectional view of FIG. 1. This feed conveyor includes a screw auger 18 that is supported for revolution within a cylindrical tube 20. This auger 18, as previously indicated, is also mechanically coupled to the drive mechanism through the speed reduction unit 24. For this purpose, the screw auger 18, which includes a central elongated shaft 30, has that shaft 30 mechanically coupled to the output of the speed reduction unit. One end of the shaft 30, which is the end that is coupled to the speed reduction unit 24, is supported by a bearing 32 secured to the end of the tube 20. This bearing 32 not only provides radial support for the shaft and its associated auger element components, but preferably is designed to provide resistance to axial thrust that will be exerted as a consequence of the operation of the auger. The opposite end of the auger 18, which terminates at the right end of the tube 20, is not mechanically supported within that tube. It is, however, supported mechanically by interconnection with rotatable elements in the extruder 14 with the extreme right end of that mechanism also being carried in a guide bearing 34. Bearing 34 is preferably a simple journal guide bearing to provides radial support for the shaft.

Figure 6:
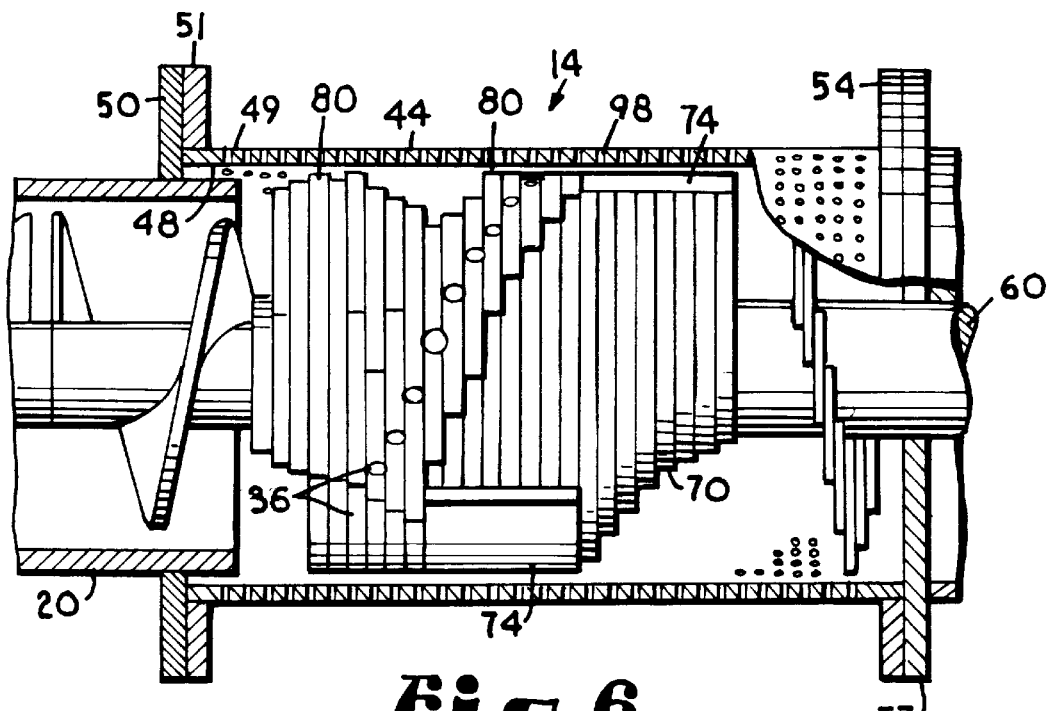
FIG. 6 is a fragmentary sectional elevation view of an extruding rotor and barrel.

Positioned in axially following relationship to the feed conveyor 10 is the pellet extruder 14. Structure and function of the extruder can be best seen by reference to FIGS. 2 and 6. The pellet extruder includes two primary components which are generally identified as the extrusion cylinder 44 and an extrusion rotor 46. These two elements are disposed in axially aligned relationship to the tube 20 and auger 18 of the feed conveyor 10 and each are mechanically coupled to the cylinder 44 and rotor 46, respectively, as further described below. The extrusion cylinder 44 comprises an elongated cylinder having respective inner and outer wall surfaces 48 and 49. One end of the extrusion cylinder 44 is mechanically secured to the terminal end of the feed conveyor tube 20 preferably by means of a pair of cooperative bolt flanges 50 and 51. The one bolt flange 50 is fixedly secured as by welding or the like to the outer periphery of the feed conveyor tube and the other bolt flange 51 is rigidly secured to the outer wall 49 of the extrusion cylinder. A seal ring (not shown) preferably is interposed between the opposed faces of the bolt flanges 50 and 51 to provide a substantially fluid tight seal therebetween and those flanges are mechanically secured together by means of a plurality of bolts angularly disposed around the flanges. The cylinder 44 may be of the same or slightly larger diameter as the feed conveyor tube 20 with the inner wall surface 48 thus being contiguous to and essentially forming a continuation of the inner wall or the tube 20. The axial length of the cylinder 44, as well as the extruding rotor 46, is determined by the type of material that is to be processed into pellets and also the processing capacity of the apparatus. It is also dependent on the configuration and size of the rod-shaped elements that are to be extruded and form the pellets. A bolt flange 54 is secured to the opposite end of the extruding cylinder and forms a means for mechanical coupling with the rock trap 16. Utilization of the bolt-type interconnection as between the extrusion cylinder 44 and the feed conveyor as well as with the rock trap 16 is of particular advantage in that it facilitates disassembly of the components for purposes of cleaning as well as replacement of components or adjustments.

Figure 2:
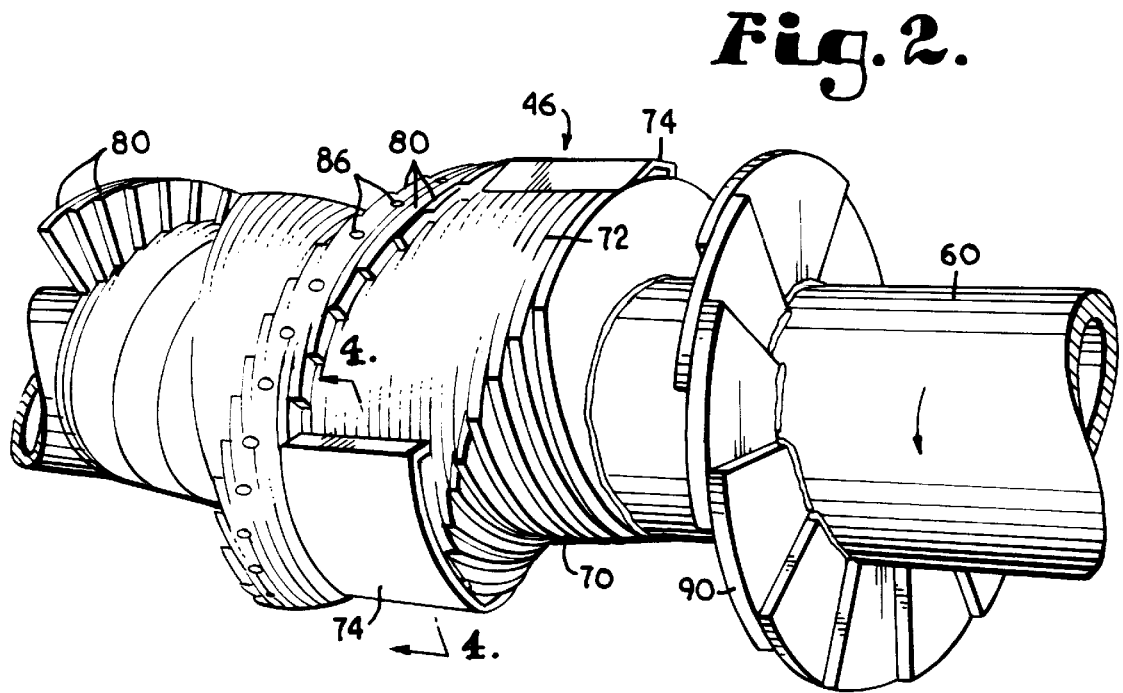
FIG. 2 is an isometric view of one embodiment of the extruding rotor of the apparatus shown in FIG. 1.

Turning now to the extrusion rotor 46, as best seen in overall perspective in FIG. 2, the extrusion rotor 46 presents three distinct surface configurations or tiers arranged in a helical form on axial shaft 60. The first tier, the helix face, generally denoted by the numeral 70 is a face which forms a helical spiral around the shaft 60 which, as the shaft is rotated serves to impel material axially into the extruder and radially towards the interior wall 48 of cylinder 44. The second tier 72 is a face radially a greater distance from the axis of the shaft 60 than face 70, and contains pusher face 74. As best seen in FIGS. 3 & 4, pusher face 74 is preferably configured with a beveled leading edge 76 and a relatively squared off trailing edge 78. The pitch of the leading edge 76 is preferably about 30 degrees as measured from a chord across a circle centered around the axis of the rotor. The pitch may vary substantially to accommodate anticipated extruding materials. Generally stated, with increasing material viscosity, less slope (i.e. over 30 degrees) is preferred. The pusher face 74 closely conforms to the inner wall 48 of cylinder 44, leaving preferably about $\frac{1}{32}$ to $\frac{1}{64}$ inch of clearance. In operation, the pusher face 74 operates to create a wedge-shaped pressure zone immediately at the inner wall 48 of the cylinder 44, which effects extrusion. The pusher faces 74 are configured in a spaced relation around the rotor 46, so that overlapping patterns are traced out by the faces 74 as the rotor 46 rotates about its axis. The third tier is the wiper face 80, which conforms most closely to the inner wall 48, and serves to wipe materials from the wall 48 as the rotor 46 rotates about its shaft 60.

As is illustrated in FIG. 2, a complete rotor 46 forms preferably about one and one-half turns about the shaft 60. If substantially less than one and one-half turns is used, a significant portion of material for extrusion may slip back past the rotor, causing loss of extrusion. Significantly greater than one and one half turns does not appear to enhance the operating characteristics of the extruder.

A preferred feature of the rotor 46 is the use of a series of pins 86 and springs 88 located in a series of holes along the edge of the wiper face 80. In an assembled configuration, the springs 88 are in a compressed state so as to urge the pins 86 outwardly against the interior wall 48 of the extrusion cylinder 44. These pins 86 are further arranged so that as the rotor rotates about its axis, the pins trace overlapping paths on the interior cylinder wall 48. In this manner, fibrous material and the like may be sheared off at the interior cylinder wall 48.

As shown in FIG. 1, the present invention preferably includes what is referred to as a rock trap 16 which is located on the far end of the extrusion cylinder 44. This rock trap comprises a cylindrical housing including a cylindrical wall 92 that is closed at the extreme end by an end wall 94. Secured to the open end of the rock trap cylinder 92 is a bolt flange 96. This bolt flange is adapted to fit with the bolt flange 54 carried on the end of the extrusion cylinder 44 and it is secured thereto by a plurality of bolts. To provide a fluid tight seal between these components, a sealing ring (not shown) preferably is interposed between the two bolt flanges. Carried on the end wall 94 is a guide bearing 34 which supports the extrusion rotor 46 and thereby also provides support for the auger 18 of the feed conveyor 10. Advantageously, the shaft 60 may be fitted with a series of flat segments forming a diverter 90 arranged in a spiral pattern in a reverse direction to the feed conveyor 10 and extruder rotor 46. In this manner, non-extruded materials, such as rocks which pass beyond the extruder rotor 46, will be forced axially away from the guide bearing 34. Such an arrangement serves to provide protection for the bearing 34 from rocks and the like.

Formed around the extrusion cylinder 44 are a large number of apertures or passages 98 through which the material is extruded to form pellets. The orientation and location of these apertures 98 can be best seen by reference to FIGS. 6. If the longitudinal axis of the present invention is horizontal, the apertures 98 are preferably formed around only the portion of the circumference of the extrusion cylindrical 44 which would be most closely oriented for horizontal or downward discharge of the material through the orifices. Thus, the extrusion cylinder 44 preferably is not formed with the apertures 98 in the upper regions as the cylinder is disposed in a horizontal position, with about the top 20 to 30 degrees of the circumference not having apertures 98. It has been found that discharge of the material through apertures 98 oriented on the upper side of the extrusion cylinder tends cause material to fall downwardly onto the cylinder 44 and interfere with the discharge of material and the formation of pellets. It is also noted that apertures 98 need not extend to the end of the portion of cylinder 44 utilized for the rock trap 92 or diverter plates 90.

In the preferred embodiment, the apertures 98 are formed in alternately offset relationship to adjacent apertures 98. This provides an ability to locate the apertures in relatively close proximity to each other and thereby increase the extrusion capacity. Other orientations and arrangements of the apertures may be utilized depending upon the particular material that is to be extruded. It will also be understood that the size of the apertures 98 may be of various diameters in accordance with the desired characteristics of the pellets to be formed by the extrusion process, from about one-eighth inch in diameter up to about three-eighths inch in diameter. It is also noted that the thickness of extrusion cylinder 44 may vary in accordance with the characteristics of the material to be extruded and the characteristics desired to be obtained in the resulting pellets. Preferably, the extrusion cylinder 44 wall is from about three-eights inch thick to about one inch thick, with larger diameter cylinders generally having thicker walls. Although the thickness of the wall effects the strength of the extrusion cylinder, because the present invention is a low pressure device, the thinner wall generally is structurally acceptable. However, the thickness of the wall and the size of aperture 98 also has substantial effect on the characteristics of the resulting pellets, such as the hardness of those pellets. The thicker the wall of cylinder 44 is for any particular material, or the smaller an aperture 98 is, the harder will be the pellets that are formed by extrusion. With an increase in the wall thickness, the extrusion will result in greater compacting pressure of the material within the apertures. Thus, with increased pressure, the material is compacted more tightly and this will result in an increase in a relative hardness of the resulting pellets. Good results have been obtained with extrusion cylinder 44 wall thickness chosen to be greater of equal to twice the diameter of the apertures 98.

Rotor Fabrication

An important aspect of this invention is the unique method of rotor fabrication. As may best be seen in FIGS. 3 & 4, in one embodiment the rotor 46 may advantageously be comprised of a series of stacked plates 100, each shaped essentially like the next, and stacked one on the next on shaft 60. Use of the term "essentially like" in this context indicates that adjacent plates share the same basic characteristic shape, although plate shape, especially for the plates near the end of a rotor, vary to suit the transition requirements which are required for the particular application. As each adjacent plate is added to the stack to form a rotor, it is rotated about the axis of the shaft 60 preferably from about 5 to about 10 degrees as compared to the adjacent plates, so as to form a spiral pattern. See FIG. 2. FIG. 3 illustrates three plates 100 stacked one on the other, each plate rotated with respect to the last.

In one embodiment, an entire rotor may be formed by stacking a series of plates 100, each substantially the same as the other and rotated one plate with respect to the other about shaft 60 in the respective direction and amount. A suitable plate for this embodiment is shown in FIG. 4. This exemplary individual plate generally may be described as having an outer edge forming a first arc 102 which encompasses about 90 degrees of the plate, the degrees measured by reference to the axis of shaft 60 which is here defined to be the center of the plate, which first arc 102 closely conforms to the shaft 60, essentially forming a circular arc centered on the center of the plate with a radius about ½ inch greater than the radius of shaft 60. A second arc 103 curves out from the terminus of arc 102 away from shaft 60 to a point where a third arc 104 begins, the second arc encompassing about 100 degrees around the center of the plate. This second arc 103 is also generally circular, but with the center and the circle set so that a smooth transition is had between arcs 102 and 103. The third arc 104 encompasses about 125 degrees around the center of the plate 100 and follows a generally circular path centered at the center of the plate 100 and has a radius from about one-half to about one inch from the maximum diameter of the rotor 46. At the end of the third arc 104, a first radial line 105 continues to a fourth arc 106 which arc encompasses about 45 degrees around the center of the plate and forms a circular arc at the maximum rotor diameter, the end of which fourth arc 106 is joined to the start of the first arc by a radial line 108.

In relating these plate dimensions to a completed rotor, it is noted that the portion of the plates 100 denoted as the fourth arc 106, is the most outward portion of the plates and, when the stacked plates 100 are joined, the sum of those portions form the third tier of the rotor, the wiper face 80. Similarly, the sum of the arcs 104 form the second rotor tier 72. It will be understood that, in assembling a completed rotor, the pusher face 74 is separately attached to the rotor after the plates are joined. Further, it should be understood that the arcs 102 and 103 together form the helix face 70 when the plates are joined.

In another embodiment, the shape of the plates 100 is modified at the inlet end of the rotor 46. FIG. 8 shows a sampling of exemplary plates, labeled P3, P4, and the like to signify the sequence of the plates in a stack of plates which make up a complete rotor 46, i.e., P3 is the third plate, P4 is the fourth plate and so forth. Moreover, the lowest plate numbers assigned to the plates which are nearest the inlet end of the rotor. Further, in this exemplary embodiment it was assumed that a total of 96 plates were used to make a completed rotor, although the number of plates used will vary depending upon the factors discussed below. The plate shape varies from plate P1 (not shown) to plate P26. Plates numbered from P26 to P96 are the same shape as P26, although the plates are rotated around the shaft 60 to form a completed rotor 46. In order to demonstrate the progression of the plates around the shaft 60, keyway 110 is shown on each of the plates in FIGS. 8 and 9. The keyway signifies a keyway to mate with a key along the outer edge of shaft 60 parallel to the longitudinal axis of the shaft. In this embodiment, the fourth arc 106 portion of the plates 100 can be seen to have substantially the same arc dimension for all plates. Since arc 106 forms the wiper face, this means that the dimensions of the wiper face 80 of a completed rotor is substantially the same throughout the length of the rotor. The third arc 104 grows from nothing in plate P3, to its maximum arc dimension in plate P26. This results in the second tier 72 growing from being nonexistent at the inlet end of the completed rotor to its full dimension by plate P26 and, then maintaining its full dimension through plate P96. It can be seen that the length of the arc 103 remains relatively constant while arc 102 shrinks as arc 104 grows from P3 to P26. This results in the relative shape of the helix face formed by arcs 102/103 changing from P3 to P26. However, as can be seen, the relative position of arc 103 relative to the keyway 110 remains generally constant from P1 to P26, after which the arc 103 progresses around the shaft 60 relative to the keyway 110.

The thickness of the plates 100 is selected in conjunction with the desired pitch and flight thickness of the rotor 46. For example, the thinner the plate 100, the thicker the resulting flight will be. Moreover, generally stated, for larger extrusion cylinder 44 diameters, thicker plates 100 are used. Typically, plates from ³⁄₁₆ inch to ¾ inch have been used for the present invention rotor 46. The thickness of the plates 100 and radial size of the rotor, along with relative displacement of one plate to the next determine the pitch of the helix along its longitudinal axis. As a means to demonstrate these various principles, the following non--limiting example is provided:

Example

Figure 9A:
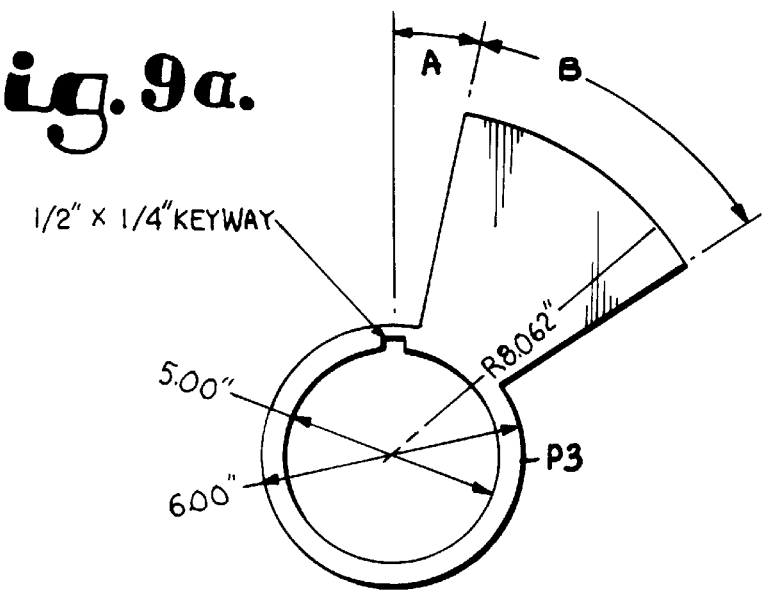
Figure 9B:
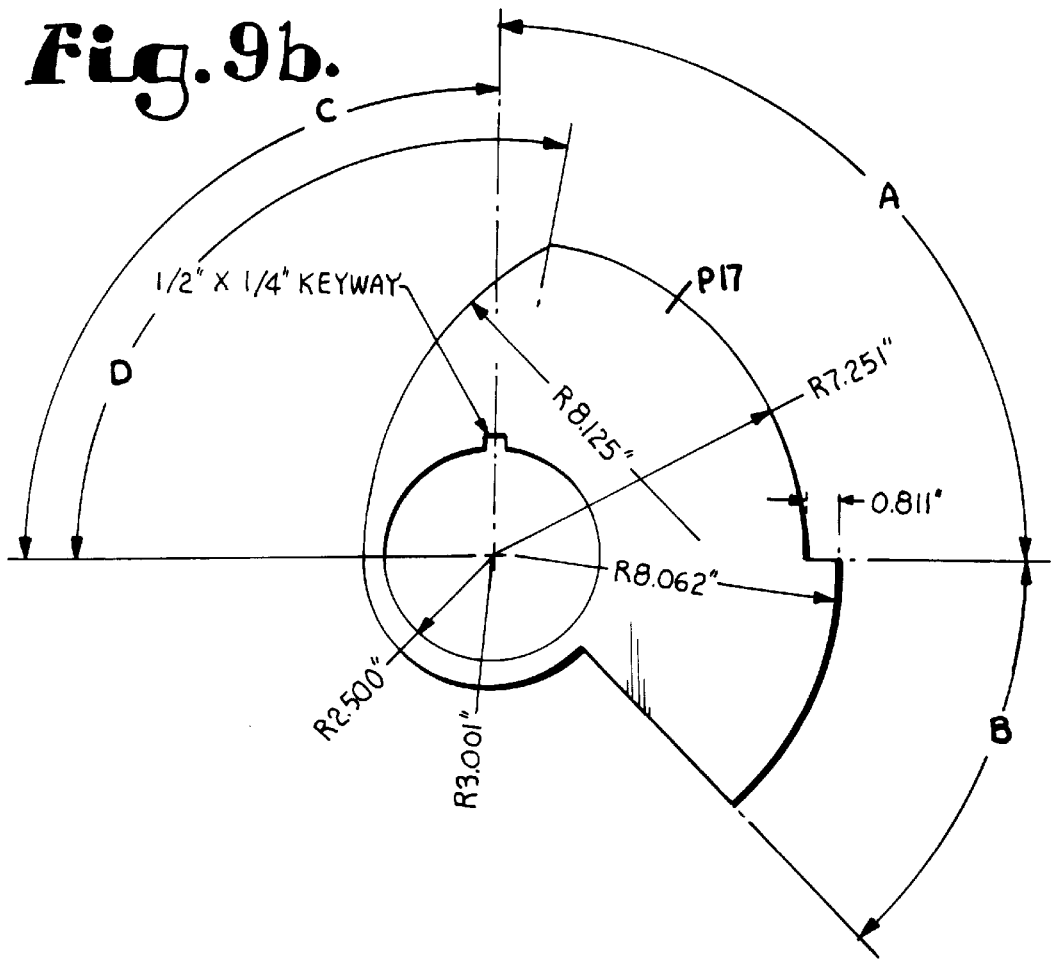

For a sample rotor diameter of 16 inches, a rotor with a pitch of one would make a 360 degree progression around the shaft 60 in 16 inches. Selecting a plate thickness of ¼ inch, it can be seen that 64 plates are required to create an axial length of 16 inches. Using a desired turn-and-a-half configuration as discussed above, a total of 96 plates (64 plus 32) is needed for a complete rotor. If 64 plates are used to make a 360 degree rotation of the plates (as measured by rotation of the fourth arc 106), a 5.6 degree shift per plate is required (360/64). Such a 5.6 degree per plate progression is shown in FIGS. 8 and 9. Like dimensions on the three plates of FIGS. 9A, 9B and 9C (plates P3, P17 and P26, respectively, which correspond to like-numbered plates in FIG. 8) are approximately as follows:

TABLE 1

| Plate | Angle A<br>Key 110 to Arc<br>102 (Degrees) | Angle B<br>Arc 102<br>(Degrees) | Angle C<br>Arc 106 to Key 110<br>(Degrees) | Angle D<br>Arc 106<br>(Degrees) |
| --- | --- | --- | --- | --- |
| P3 | 10 | 45 | N/A | N/A |
| P17 | 91 | 45 | 90 | 117 |
| P26 | 136 | 45 | 90 | 105 |

Further exemplary dimensions for these plates to make a complete rotor are shown in FIGS. 9A, 9B, and 9C. These dimensions are illustrative of typical dimensions for a 16" rotor, but are not intended to limit the scope of this invention. As discussed above, the pusher faces 74 are affixed to the plates 100 after the plates are assembled into a rotor.

The plates 100 may be cut by conventional means such as plasma arc cutting and the like. The plates 100 are then ground and fitted to remove burrs. The plates 100 preferably are affixed to the shaft 60 and each other using conventional welding techniques and making use of a key configuration. The materials used for rotor and extruder formation will depend upon the particular service involved. For example in food applications, stainless steels may be preferred. In other applications, common types of carbon steel, aluminum, or other metals may be preferred. It is apparent, however, that this plate-on-plate fabrication method makes variation in the type of materials, as well as the size and precise configuration of the finished extruder much easier than would be possible in casting or other conventional techniques for fabrication of complex shapes such as rotor 46. As is apparent to one skilled in the art, this repeated plate-on-plate configuration provides for an ease of fabrication of the rotor 46 and substantial flexibility in configuration of the rotor.

Figure 7:
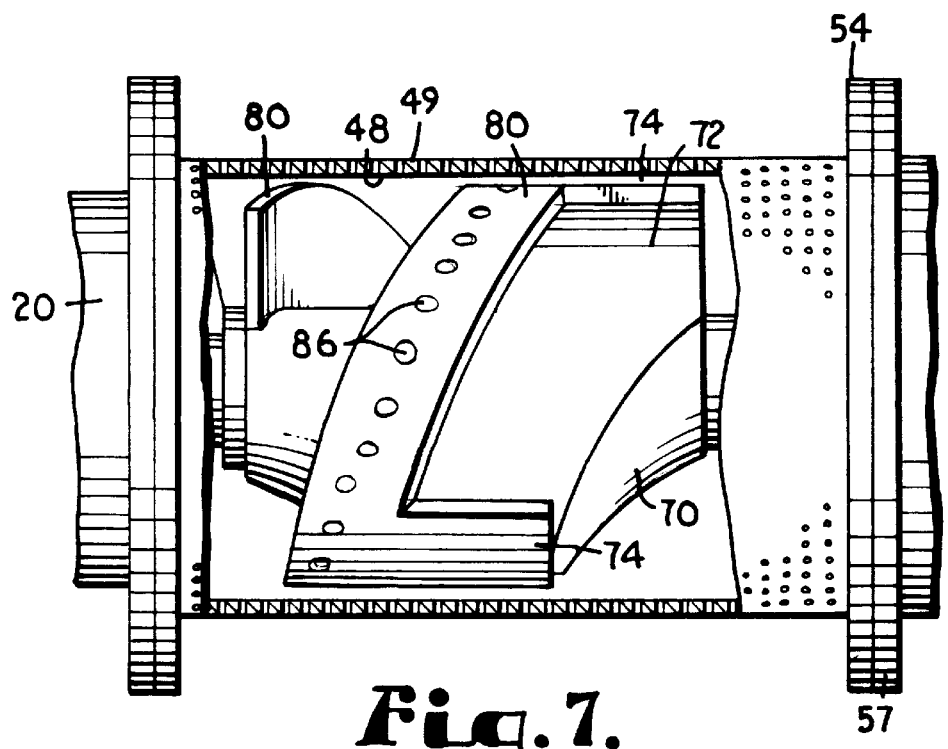
FIG. 7 shows an alternative embodiment of the present invention extruding rotor.

As an alternative embodiment as shown in FIG. 7, rotor 46 may be machined from a single block of material. Although manufacturing costs of utilizing a single block of material are higher, there are advantages, such as ease of cleaning a single block versus stacked plates, which may warrant the additional cost in certain installations. In this alternative embodiment, the various surface configurations, the helix face 70, the second tier 72 and the third tier wiper face 80 are may advantageously be made smooth as depicted in FIG. 7 for handling various types of materials.

Description of Operation

Referring generally to FIG. 1, in operation, the present invention device will preferably be fed materials of suitable pliability through a conventional feeder 12 and feed conveyor 10. Feed conveyor 10 generally may be a screw conveyor of conventional design to convey material to be extruded into the extruder 14. Conveyor 10 may provide some pressure to the material being fed into the extruder 14, although generally the extruder operates with little pressure at the inlet of the extruder section, in contrast to prior art feeders which build high pressure at the inlet to the extruder section.

Material from the feed conveyor 10 is provided to the inlet of the extrusion rotor 46. As the rotor 46 turns, see FIG. 2, material is initially drawn into the rotor axially, primarily by action of the revolving wiper face 80. As the material thus is drawn into the rotor 46, the revolving surface of the helix face 70 forces the material radially outward and, thus, onto the second tier of the rotor 72. As the rotor 46 continues to revolve, material on the second tier is pushed further outwardly first by the beveled edge of the pusher face 76 and then further against the inside wall of the extrusion cylinder 48. Material thus forced against the extrusion cylinder wall is forced through the extrusion apertures 98.

Material not extruded by action of the pusher face 74 is contacted by further action of the rotating wiper face 80. The wiper face 80 closely conforms to the interior wall 48 of the extruder cylinder 44. In addition, the pins 86 in the wiper face 80 are held tightly against the interior wall 48 by action of the springs 88, thus effectively scraping the wall of material and re-entraining the material in another extruding cycle.

As discussed further herein, apparently because the present rotor contains both axial and radial displacing elements, it effects extrusion in a substantially power-efficient manner. Basically, the action of the rotor 46 causes pressure pulses to extrude the material, minimizing pressure buildup in other portions of the device. In this manner, by eliminating the need to pressurize the material unnecessarily, substantial power savings are achieved.

Other Operational Considerations

The material with which this pellet-forming apparatus is designed in particular to function consists of solid particles intermixed and combined with a certain amount of moisture that is in the form of a liquid such as water. This description of the material is for purposes of illustration only as the material may have characteristics that would not accurately fit within the terminology of being solid particles and a liquid such as water. However, the material will consist of solids that are in some physical form and are sufficiently pliable to be mechanically manipulated so as to be capable of being formed into rod-shaped pellets.

As the apparatus is designed to be constructed in a physical embodiment and configuration that is best suited for handling of materials of this nature, the auger 18 is designed to be operated at a specific rate of revolution that is best adapted to handling of a particular material. The speed of rotation of the auger 18 is best controlled to be within the range of about 40 to about 150 rpm. Generally good results have been obtained by beginning operation at about 60 rpm, and then adjusting the rotational speed to get the best operational results. This rotational speed may accomplished by combinations of speed reduction units, belt and pulley arrangements, and variable speed motors.

Power requirements for operation of any particular size apparatus is determined by the physical size and material handling capacity of the composite apparatus. Exemplary of the apparatus size is a feed conveyor 10 having an auger 18 which has an external diameter of about 12 or 14 inches. This size present invention apparatus generally may be driven by a motor which has a power capacity in the range of 75 to 100 HP. Smaller motors, in the range of 40 to 75 HP are suitable for 8 inch diameter devices and it is anticipated that up to about 300 HP may be required for a 24 inch device. It is noted that these power requirements are on the order of one-half to one-fourth of the power requirements of a prior art extruder of similar size and capacity.

The unique multi-tier design of the extruding rotor of the present invention is a significant departure from prior art extruders. As noted above, the typical prior art extruder rotors are axially differentiated in that the auger which is used to build pressure is separate from any extrusion wiping assembly. It is hypothesized that the use of a separate pressure-building auger in prior art devices contributes to the amount of power required to operate the devices as explained further below. By inspection, it is apparent that the work required to overcome the frictional losses experienced in operation of an extruder are a direct function of the amount of pressure exerted on the extruder elements and the length over which the pressurized material is moved. Expressed mathematically:

$$W_F = k_1 \int_0^x k_2 p_x A_x \, dx;$$

where $W_F$ is the work required to extrude due to material friction, $k_1$ and $k_2$ are constants, $p_x$ is the pressure at point x; x is the axial displacement along the extruder cylinder; and $A_x$ is the cross section area per unit length. Thus, in first compressing a material to high pressure and then moving it along a tube to an extruding head, significant frictional losses are incurred. In comparison, the present invention rotor incorporates three basic types of rotor shapes into one rotor. This combined or multitier rotor shape facilitates efficient operation of the rotor by combining the compressing and extrusion operations into a short segment of the device. Thus, it is opined that both because the material is extruded at a lower pressure, as well as because the material need not be moved through a barrel in a pressurized state, fewer frictional losses are incurred in operation of the present invention device.

A key aspect of this invention is that the extrusion action is performed on a low pressure basis using relatively high moisture feed materials. This extruding operation results in incremental formation of elongated strands of compacted material as that material is forced radially outward through the respective apertures 98. The particles of the material are thereby compacted in a manner so that the adjacent particles will be forced into close contacting association and with the appropriate moisture content, result in adhesion of adjacent particles to each other. Those particles thus are incrementally extruded through the apertures forming the elongated strands that will tend to fall in a downward direction from the extruding cylinder. Those strands will be of a length that is dependent upon the cohesive force between the particles, the diameter of the strands and the relative weight of the material. In general, those strands will break into separate pieces and will be of indeterminate length. In order to cut the elongated strands into preset lengths, a cutter bar assembly known in the art may be fitted to the cylindrical configuration.

Typically, the apertures 98 are of a circular cross section which results in formation of strands and pellets of circular configuration. However, the configuration of the apertures may be other than circular. For example, apertures 98 of a rectangular or square shaped cross section may be desirable in some applications.

The embodiments of the apparatus as illustrated are shown and described as having an extrusion cylinder and associated extrusion rotor disposed in axial alignment with a feed conveyor. In such an arrangement, it is advantageous to mechanically couple the extrusion rotor to the feed auger and have them both simultaneously revolve at the same speed and driven by the same power input mechanism. However, the structure may be modified so that the extrusion rotor in either embodiment would be rotated separate from the feed conveyor auger and may be driven at a different rotational speed. Also, in the case where the pellet extruder would be fed by a mechanism other than the feed conveyor, then the rotor of that apparatus would be provided with its own drive mechanism for revolving the rotor. Thus the case of an apparatus having both a feed conveyor and, also, a pellet extruder with its associated rotor, the rotor and conveyor could be driven at relatively different rotational speeds if that should be found of advantage in a particular installation or operating environment.

It is also contemplated that the pellet extruder could be provided with means other than a feed conveyor for causing the material to flow into the entrance end of its cylinder. Whether this is feasible in any particular instance again is dictated by the material that is to be pelletized and its particular characteristics. It is contemplated that a material feed mechanism could be provided whereby material can be fed such as by a gravity feed mechanism directly into the entrance end of the extrusion cylinder.

Example

Material extrusion on a wide variety of materials has been tested with the present invention. The following materials that are considered difficult to extrude materials were successfully extruded into useful pellets using the present invention device:

TABLE 2

| Product: | Moisture content, percent by weight: |
| --- | --- |
| Alfalfa | 60 |
| Brewers grain with soy and lactose | 49 |
| Corn and turkey mix | 48 |
| Daf sludge | 53 |
| Daf sludge | 75 |

TABLE 2-continued

| Product: | Moisture content, percent by weight: |
| --- | --- |
| Chicken hatchery waste | 57 |
| Chicken hatchery waste | 69 |
| Chicken manure | 60 |
| Molasses & sunflower hulls | 30 |
| Mushroom compost | 58 |
| Potato waste | 45 |

None of the tested above reasonably could be pelletized using prior art high pressure extruders, due to the high moisture content. In contrast, the present invention effectively pelletized all of the above materials as tested. The present invention effectively pelletizes materials with a relatively high moisture content of from about 25 to about 80 percent by weight. Preferably, for pelletizing with the present invention, the moisture content is from about 30 to about 60 percent by weight.

From the foregoing, it will be seen that this invention is one well adapted to attain all the ends and objects set forth, along with other advantages which are obvious or are inherent to the invention.

It is contemplated by and within the scope of the claims that certain features and sub-combinations are of utility and may be employed without reference to other features and sub-combinations.

Since many possible embodiments may be made of the invention without departing from its scope, the matters set forth in this application are to be interpreted as illustrative and not in a limiting sense.

I claim:

1. A pellet-forming apparatus for forming pliable material into elongated rod-shaped elements comprising:

an elongated extruding cylinder having an entrance end through which the material is introduced into said cylinder, said cylinder having a cylindrical wall with interior and exterior surfaces, and a longitudinal axis said wall defining a plurality of radially oriented orifices each of which orifices open to respective interior and exterior surfaces of said cylindrical wall and through which orifices the material may be extruded in a radially outward direction, said orifices distributed in a spaced relationship around said cylinder, and a helically-shaped extruding rotor, said rotor having an axis disposed along the axis of said cylinder, wherein said extruding rotor extends axially through said extruding cylinder and is supported for revolution therein about said longitudinal axis of said cylinder, said rotor having a helix face, a pusher face, and a wiper face, said faces occupying substantially the same area along the axis of said rotor, said helix face configured to urge the material axially into said extruding cylinder from said entrance end and radially away from the axis of said rotor so as to position the material in proximity to said pusher face, said pusher face comprising a plurality of pusher bars configured to wipe said material against the interior of said cylinder so as to extrude the material through said passages when said rotor is rotated about its axis, and said wiper face comprising a helix-shape ridge configured to wipe the material from the interior face of said cylinder; and drive means mechanically coupled with said extruding rotor for effecting revolution thereof.

2. A pellet-forming apparatus as claimed in claim 1 wherein said rotor is comprised of a plurality of flat plates, each said plate essentially configured like the other said plates, all said plates stacked one on the other about an extended cylindrical shaft, with an axis, said plates configured to form said helix face and said pusher face when assembled as a rotor, each said plate having flat sides arranged so that the axis of said shaft is perpendicular to the sides of said plates.

3. A pellet-forming apparatus as claimed in claim 1 further including a feeder conveyor for feeding of the material into said extruding cylinder, said feeder conveyor having an inlet end into which material is introduced and an exit end from which material is discharged, said feeder conveyor disposed with its exit end in operative relationship to the entrance end of said extruding cylinder to effect feeding of material into said cylinder.

4. A pellet-forming apparatus as claimed in claim 3 wherein said feeder conveyor includes an elongated screw-auger supported for rotation in a tube and a drive means mechanically coupled with said screw-auger and operative to rotate said screw-auger at a predetermined speed.

5. A pellet-forming apparatus as claimed in claim 4 wherein said drive means consists essentially of an electric motor which is from about 75 to about 100 horsepower.

6. A pellet-forming apparatus as claimed in claim 4 wherein said extruding rotor is configured to rotate from about 40 to about 150 rpm.

7. A pellet-forming apparatus for forming material consisting of a mixture of pliable solids and a liquid into elongated rod-shaped elements comprising:

an elongated extruding cylinder having an entrance end through which the material is introduced into said cylinder, said cylinder having a cylindrical wall with interior and exterior surfaces and a longitudinal axis, said wall defining a plurality of radially oriented orifices each of which orifices open to respective interior and exterior surfaces of said cylindrical wall and through which orifices the material may be extruded in a radially outward direction, said orifices distributed in a spaced relationship around said cylinder, and a helically-shaped extruding rotor, said rotor having an axis disposed along the axis of said cylinder, said rotor having a helix face, a pusher face, and a wiper face, said faces occupying substantially the same area along the axis of said rotor, said helix face configured to urge the material axially into said extruding cylinder from said entrance end and radially away from the axis of said rotor so as to position the material in proximity to said pusher face, said pusher face comprising a plurality of pusher bars configured to wipe said material against the interior of said cylinder so as to extrude the material through said passages when said rotor is rotated about its axis, and said wiper face comprising a helix-shape ridge configured to wipe the material from the interior face of said cylinder.

8. A pellet-forming apparatus as claimed in claim 7 wherein said rotor is comprised of a plurality of flat plates, each said plate essentially configured like the other said plates, all said plates stacked one on the other about an extended cylindrical shaft with an axis, said plates configured to form said helix face and said pusher face when assembled as a rotor, each said plate having flat sides arranged so that the axis of said shaft is perpendicular to the sides of said plates.

9. A pellet-forming apparatus as claimed in claim 7 further including a feeder conveyor for feeding of the material into said extruding cylinder, said feeder conveyor having an inlet end into which material is introduced and an exit end from which material is discharged, said feeder conveyor disposed with its exit end in operative relationship to the entrance end of said extruding cylinder to effect feeding of material into said cylinder.

10. A pellet-forming apparatus as claimed in claim 9 wherein said feeder conveyor includes an elongated screw-auger supported for rotation in a tube and a drive means mechanically coupled with said screw-auger and operative to rotate said screw-auger at a predetermined speed.

11. A pellet-forming apparatus as claimed in claim 10 wherein said drive means consists essentially of an electric motor which is from about 75 to about 100 horsepower.

12. A pellet-forming apparatus as claimed in claim 10 wherein said extruding rotor is configured to rotate from about 40 to about 150 rpm.

13. A pellet-forming apparatus for forming material consisting of a mixture of pliable solids having a 30 to 75 percent moisture content into elongated rod-shaped elements comprising:

an elongated extruding cylinder disposed with its longitudinal axis substantially horizontal and having an entrance end through which the material is introduced into said cylinder, said cylinder having a cylindrical wall with interior and exterior surfaces, said wall defining a plurality of radially oriented orifices each of which orifices open to respective interior and exterior surfaces of said cylindrical wall and through which orifices the material may be extruded in a radially outward direction, said orifices distributed in a spaced relationship around said cylinder, feeder means to feed measured flow of the material into said entrance end, a helically-shaped extruding rotor, said rotor having an axis disposed along the axis of said cylinder, said rotor having a helix face, a pusher face, and a wiper face, said faces coextensive along the axis of said rotor, said helix face configured to urge the material axially into said extruding cylinder from said entrance end and radially away from the axis of said rotor so as to position the material in proximity to said pusher face, said pusher face comprising a plurality of pusher bars configured to wipe said material against the interior of said cylinder so as to extrude the material through said passages when said rotor is rotated about its axis, and said wiper face comprising a helix-shape ridge configured to wipe the material from the interior face of said cylinder, prime mover means to rotate said rotor about its axis in said cylinder.

14. A pellet-forming apparatus as claimed in claim 13 wherein said rotor is comprised of a plurality of flat plates, each said plate essentially configured like the other said plates, all said plates stacked one on the other about an extended cylindrical shaft with an axis, said plates configured to form said helix face and said pusher face when assembled as a rotor, each said plate having flat sides arranged so that the axis of said shaft is perpendicular to the sides of said plates.

15. A pellet-forming apparatus as claimed in claim 13 further including a feeder conveyor for feeding of the material into said extruding cylinder, said feeder conveyor having an inlet end into which material is introduced and an exit end from which material is discharged, said feeder conveyor disposed with its exit end in operative relationship to the entrance end of said extruding cylinder to effect feeding of material into said cylinder.

16. A pellet-forming apparatus as claimed in claim 15 wherein said feeder conveyor includes an elongated screw-auger supported for rotation in a tube and a drive means mechanically coupled with said screw-auger and operative to rotate said screw-auger at a predetermined speed.

17. A pellet-forming apparatus as claimed in claim 16 wherein said drive means consists essentially of an electric motor which is from about 75 to about 100 horsepower.

18. A pellet-forming apparatus as claimed in claim 16 wherein said extruding rotor is configured to rotate from about 40 to about 150 rpm.

* * * * *